US006292495B1

United States Patent
Von Hammerstein et al.

(10) Patent No.: US 6,292,495 B1
(45) Date of Patent: *Sep. 18, 2001

(54) SEGMENTED PERMANENT VIRTUAL CIRCUITS

(75) Inventors: Charles G. Von Hammerstein, San Jose; Robert Simon, Santa Barbara, both of CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,874

(22) Filed: Apr. 10, 1998

(51) Int. Cl.[7] ................................................. H04L 12/56
(52) U.S. Cl. ........................... 370/465; 370/395; 370/471
(58) Field of Search ................................... 370/389, 395, 370/428, 466, 474, 465, 396, 397, 400–409, 470, 477

(56) References Cited

U.S. PATENT DOCUMENTS

| 5,490,140 | * | 2/1996 | Abensour et al. ..................... 370/371 |
| 5,539,734 | * | 7/1996 | Burwell et al. ....................... 370/410 |
| 5,896,496 | * | 4/1999 | Suzuki ............................. 395/185.01 |
| 5,936,948 | * | 8/1999 | Sicher .................................. 370/314 |
| 5,946,670 | * | 8/1999 | Motohashi et al. ................... 705/400 |
| 5,987,034 | * | 11/1999 | Simon et al. ......................... 370/465 |
| 5,999,524 | * | 12/1999 | Corbalis et al. ..................... 370/352 |

OTHER PUBLICATIONS

Frame Relay Specification with Extensions, Document No. 002–208966 Rev. 1.0 Published by Digital Equipment Corporation, Nothern Telecom, Inc., and StrataCom, Inc. (Sep. 18, 1990).

American National Standards Institute ("ANSI"). T1.606. Integrated Services Digital Network (ISDN)—Architectural Framework and Service Description for Frame–Relaying Bearer Services. 1990.

American National Standards Institute ("ANSI"). T1.617.Integrated Services Digital Network (ISDN)—Signalling Specification for Frame–Relay Bearer Service for Digital Subsciber Signaling System No. 1 (DSSI). 1991.

International Telecommunication Union (ITU). ITU–T, H.323. Series H: Audiovisual and Multimedia Systems, Infrastructure of audiovisual services—Systems and terminal equipment for audiovisual services, Packet–based multimedia communications systems. (Feb. 1998).

International Telecommunication Union (ITU). ITU–T, H.320. Series H: Audiovisual and Multimedia Systems, Infrastructure of audiovisual services—Systems and terminal equipment for audiovisual services, Narrow–band visual telephone systems and terminal equipment. (Jul. 1997).

(List continued on next page.)

*Primary Examiner*—Douglas Olms
*Assistant Examiner*—Ken Vanderpuye
(74) *Attorney, Agent, or Firm*—Blakely, Sokoloff, Taylor & Zafman LLP

(57) ABSTRACT

An apparatus and method for communicating link status information for permanent virtual circuits that share a data link connection identifier. A first frame relay packet that includes link status information for a plurality of virtual circuits that each share a first data link connection identifier is received via a frame relay network. Using the link status information in the first frame relay packet, a second frame relay packet that conforms to a standard local management interface status message format is generated. The second frame relay packet is transmitted to customer premise equipment.

27 Claims, 12 Drawing Sheets

OTHER PUBLICATIONS

International Telecommunication Union (ITU). ITU–T, G.723.1 General Aspects of Digital Transmission Systems, Dual Rate Speech Coder for Multimedia Communications Transmitting at 5.3 and 6.3 kbit/s. (Mar. 1996).

"The Frame Relay Forum User–to–Network Implementation Agreement (UNI)," FRF 1.1, Frame Relay Technical Committee, Jan. 19, 1996.

International Telecommunication Union (ITU). ITU–T, G.729. General Aspects of Digital Transmission Systems, Coding of Speech at 8 kbit/s Using Conjugate–Structure Algebraic–Code–Excited Linear–Prediction (CS–ACELP .(Mar. 1996).

"Motorola Introduces Family of Voice Over IP Routers for Internet and Intranet Telephony," Press Release date Oct. 1997.

"Motorola Launches Major Initiative for Real–time Multimedia Solutions for Business Networks," Press Relase dated Apr. 28, 1997.

"Voice Over Frame Relay Implementation Agreement," FRF.11, Frame Relay Forum Technical Committee, May 1997.

"Frame Relay Fragmentation Implementaton Agreement," FRF.12, Frame Relay Forum Technical Committee, Dec. 1997.

* cited by examiner

SEGMENTED PERMANENT VIRTUAL CIRCUITS

CROSS-REFERENCE TO RELATED APPLICATIONS

This application is related to U.S. patent application No. 09/058,261 filed Apr. 10, 1998 and entitled "Frame Relay Access Device With User-Configurable Virtual Circuit Bundling".

FIELD OF THE INVENTION

The present invention relates to the field of digital communications, and more particularly to managing virtual circuits that pass through a frame relay network.

BACKGROUND OF THE INVENTION

Frame relay is a broadband packet switching technology that is often used to implement wide area networks (WANs). Many local and inter-exchange carriers offer frame relay service with access rates ranging from fractional T1 (e.g., n×64Kb/s) to multimegabit (e.g., 44.736 Mb/s T3). Pricing is usually determined by the access line rate, the number of permanent virtual circuits (PVCs) managed by the network and the bandwidth consumed by each PVC. Frame relay is defined by American National Standards Institute (ANSI) specification T1.606, published in 1990 and entitled "Telecommunications—Integrated Services Digital Network (ISDN)—Architectural Framework and Service Description for Frame-Relay Bearer Service" (hereinafter, "the frame relay specification").

FIG. 1 depicts a prior art network configuration 10 in which a frame relay network 12 is used to interconnect three local area networks (LANs) 16a, 16b, 16c. Each of the LANs 16a, 16b, 16c is used to interconnect a respective set of LAN stations 18a, 18b, 18c (e.g., personal computers, workstations or larger computers) and may employ any of a number of different data link layer protocols, including Ethernet, Fiber Distributed Data Interface, Token Ring, so forth. Each of the LANs 16a, 16b, 16c is coupled to the frame relay network 12 via a respective router 14a, 14b, 14c that typically includes a frame relay packet assembly/disassembly (PAD) function to assemble data received from various LAN stations 18a, 18b, 18c into one or more frame relay packets and to disassemble frame relay packets received from the frame relay network 12 into a format according to the LAN protocol. Although each router 14a, 14b, 14c is depicted as being coupled only between the frame relay network 12 and a respective LAN 16a, 16b, 16c, a router will typically be used interconnect a LAN to several different networks.

To support LAN-to-LAN communications across the frame relay network 12, respective addresses called data link connection identifiers (DLCIs) are usually assigned to each of the LAN stations 18a, 18b, 18c. One DLCI is placed in the address field of each packet carried by the frame relay network to indicate the packet's destination. Because the DLCI effectively steers a packet through the frame relay network 12 to the indicated destination, the DLCI is said to establish a virtual circuit through the frame relay network 12. Permanent virtual circuits (PVCs) are virtual circuits in which the connections between the routers 14a, 14b, 14c and the frame relay network 12 are configured by the provider of the frame relay network 12 and remain established thereafter. Switched virtual circuits, by contrast, require special setup and termination messages to be issued to the frame relay network 12 to establish and terminate a connection.

Still referring to FIG. 1, the connection between a router 14a, 14b, 14c and the frame relay network 12 is a demarcation point referred to as a User-Network Interface (UNI), with equipment on the user side of the UNI (e.g., the router, the LAN and the LAN stations) usually being customer premise equipment (CPE) and equipment on the network side of the UNI usually being WAN provider equipment. The router 14a, 14b, 14c is commonly referred to as a frame relay access device (FRAD) because it provides customer premise equipment access to the frame relay network 12.

In 1990, a Consortium of companies including Cisco Systems, Inc., Digital Equipment Corporation, Northern Telecom, Inc. and StrataCom, Inc. developed a link monitoring interface over the UNI called the Local Management Interface (LMI) to allow customer premise equipment to monitor the status of PVCs in a frame relay network. The LMI protocol and its suite of messages are defined by an extension to the frame relay specification published by the Consortium on Sep. 18, 1990 and entitled "Frame Relay Specification with Extensions Based on Proposed T1S1 Standards, Document 001-208966". A later published ANSI standard defines a modified version of LMI ("Integrated Services Digital Network(ISDN)—Signaling Specification for Frame Relay Bearer Service for Digital Subscriber Signaling System Number 1 (DSS1), ANSI T1.617 Annex D", published in 1991). Fundamentally, the Consortium-specified LMI (hereinafter, Consortium LMI) and the ANSI T1.617 Annex D-specified LMI (hereinafter, Annex D LMI) are the same in that a FRAD issues status enquiry messages to the frame relay network 12 and the frame relay network 12 responds with status messages. Because LMI messages can become quite long and assume a one-to-one correspondence between DLCIs and PVCs, existing LMI implementations present obstacles to the transmission of voice and data over frame relay through a single UNI.

One characteristic of frame relay networks is that frame relay packets are permitted to vary in length from one packet to the next. This is in contrast to cell relay networks (e.g., FastPacket networks or Asynchronous Transfer Mode (ATM) networks) in which packets are fixed length cells. One advantage of permitting variable length packets is that, at least in larger packets, the ratio of overhead information (e.g., framing, addressing and error checking information) to payload is relatively small, meaning that a relatively small portion of network bandwidth is consumed by transmission of overhead information. By contrast, relatively short, fixed length cells (e.g., 24 or 53 octets) typically have a larger ratio of overhead to payload so that a larger portion of network bandwidth is consumed by transmission of overhead information. On the other hand, a significant disadvantage of permitting variable length packets to be transmitted on a frame relay network is that variable transmission delays are incurred as packets are queued behind one another in the network's various ingress and egress queues. As a result, data that requires a relatively fixed interval to be maintained between successive packets (e.g., packetized voice, video and other constant bit rate data) becomes distorted by the variable delays in the transmission path. This distortion is called jitter and is one reason that frame relay networks traditionally have not been used to carry voice and other constant bit rate data.

FIG. 2 illustrates a prior art network configuration 21 that allows packetized voice to be transmitted over a frame relay network 12 with significantly reduced jitter. Devices called fragmenters 22a, 22b, 22c receive variable length frame relay packets from respective routers 14a, 14b, 14c and decompose packets that are longer than a predetermined number of octets into two or more smaller packets called fragments. Each fragmenter 22a, 22b, 22c also receives voice inputs and packetizes them into fixed-length packets referred to herein as voice frames. The voice frames and the fragments adhere to the frame relay packet format and are carried by the frame relay network 12 to a destination (e.g., a LAN station 18a, 18b, 18c on a destination network 16a, 16b, 16c) indicated by their respective address fields. Because the voice frames and the fragments are transmitted to the frame relay network 12 on the same access line, long data packets would ordinarily introduce significant jitter to voice frames queued behind them. However, by decomposing long packets into relatively short fragments and then transmitting relatively short fragments across the frame relay network 12, voice frame jitter is significantly reduced. Also, different PVCs can be allocated to carry the fragments and the voice frames through the frame relay network 12 and the PVC used to carry voice frames can often be tailored for voice support. For example, it is usually more important to maintain the relative timing of a sequence of voice frames than to avoid losing frames. Consequently, the PVC for voice may be configured to have a short queue depth and to discard older frames so that if the PVC becomes congested, older voice frames will be discarded instead of being buffered in a deep queue.

FIG. 3 illustrates decomposition of a frame relay packet 24 into fragments 26a, 26b, 26c according to a prior art technique. The frame relay packet 24 includes framing flags at its beginning and end (FLAG), two octets of addressing information (ADDR) and a two octet frame check sequence (FCS). The frame check sequence is typically cyclic redundancy check value (CRC). The packet 24 also includes a variable length information field (i.e., a payload) that includes N octets of data. As indicated in FIG. 3, respective portions of the original packet 24, not including the flag octets, are copied into payload sections of successive fragments 26a, 26b, 26c. The payload section of each fragment is limited to K octets so that approximately (N/K)+1 fragments are required to represent the original packet 24. In order to delineate one sequence of fragments from the next and also to ensure that the fragments are properly applied to restore the original packet 24, a last flag and a sequence is included in the address field (ADDR) of each fragment 26a, 26b, 26c. The sequence number is incremented for each successive fragment 26a, 26b, 26c to supply fragment ordering information, and the last flag set to FALSE for each fragment 26a, 26b, 26c except the last. When a fragment having a TRUE last flag is received at a remote fragmenter, the sequence number of the fragment indicates to the remote fragmenter the total number of fragments required to reconstruct the original packet 24.

Using the fragmenting techniques described above, it is possible to transmit voice frames and fragmented data packets over the same UNI without causing unacceptable jitter in the voice frame delivery. At least one problem that remains, however, is that LMI status messages are not fragmented by a fragmenter and can become long enough to noticeably interfere with voice transmission. More specifically, LMI status messages typically include at least five octets for each allocated PVC and therefore will exceed a maximum packet length if the number of allocated PVCs rises above a predetermined number. If the LMI status message substantially exceeds the maximum packet length, a periodic "glitch" may be heard on the voice output as each full LMI status message is transmitted. This is undesirable, of course, and can be avoided by limiting the number of allocated PVCs. However, because the number of PVCs in a frame relay network is usually determined by the number of assigned DLCIs, and because an additional DLCI is typically assigned for each new LAN station that is connected for access to the frame relay network, it is often difficult to limit the number of allocated PVCs and yet keep up with demand for additional LAN station connections.

As mentioned above, a key factor for pricing subscriber access to a frame relay network is the number of PVCs allocated to the subscriber. One reason for this is that congestion management, LMI and other network management functions are performed on a per-PVC basis. Another reason is that the supply of PVCs available on a frame relay network is limited by the available number of DLCIs. In a frame relay network, one PVC is allocated for each ten bit DLCI assigned to subscriber equipment. The ten bit format allows up to 1024 DLCIs to be assigned per frame relay network. However, because one DLCI is typically assigned to each LAN station that has access to the frame relay network, DLCIs are quickly consumed as LAN station connections increase. Thus, it can be seen that allocating a large number of PVCs in a frame relay network presents a manifold problem: frame relay network resources are strained, the cost to network subscribers is relatively high and LMI status messages become so long as to interfere with transmission of voice frames through the network One technique for reducing the number of PVCs required in a frame relay network is to bundle multiple voice PVCs together under a single DLCI. This is accomplished by including multiplexing information in each of the voice packets transmitted to the frame relay network. From the perspective of the frame relay network, the bundled voice PVCs appear to be a single PVC because only one DLCI is allocated. However, when voice packets are received in a remote fragmenter or other frame relay access device that understands the sub-multiplexed addressing format, the remote device can use the multiplexing information to distinguish one PVC from another in a bundle. The voice packets can then be distributed to telephony equipment connected to the remote device according to the multiplexing information. The overall effect is to provide multiple PVCs in a bundle that appears to a frame relay network to be a single PVC.

FIG. 4 is a diagram of a prior art voice frame 30 that includes multiplexing information to allow a PVC to coexist with other PVCs in a bundle identified by a single DLCI. PVCs that are bundled under a shared DLCI are referred to herein as "sub-multiplexed PVCs to distinguish them from the "bundling PVC" perceived by the frame relay network. Each voice frame 30 transmitted on a sub-multiplexed PVC adheres to the frame relay packet structure and includes a flag octet (0111 1110=7E hex) followed by a standard, two-octet frame relay address field. The first octet of the address field includes the most significant six bits of the DLCI, followed by a command/response bit (C/R) and an extended address bit (EA). The second octet of the address field includes the least significant four bits of the DLCI followed by the forward and backward explicit congestion notification bits (FECN and BECN), a discard eligibility bit (DE) and another extended address bit. The explicit congestion notification bits are used to indicate the direction of network congestion, if any, and the discard eligibility bit is used to determine whether the frame 30 may be discarded by the network. The extended address bit is present in each octet of the address field and is zero for each octet in the address field except the last. This provides a mechanism for including additional octets in the address field if necessary. The next octet after the address field provides the multiplexing information described above and is referred to as a multiplexing value. In effect, the multiplexing value extends the precision of the destination address to allow sub-multiplexing of PVCs under a common DLCI. Each sub-multiplexed PVC is identified by a different multiplexing value. The multiplexing value is followed by the digitized voice information and then by a FCS. A flag octet ends the voice frame 30.

Although PVCs used to carry voice frames can be sub-multiplexed under a shared DLCI, PVCs used to carry bursty data packets are typically not sub-multiplexed. One reason for this is that the Consortium and Annex D LMI protocols do not provide the granularity of link status information needed to support PVC bundling. As discussed above, a one-to-one correspondence between PVCs and DLCIs typically exists in a frame relay network and link status information is provided on a per-DLCI basis. Consequently, if PVCs used to carry bursty data were bundled under a single DLCI, the LMI status response message returned by the frame relay network would indicate only the link status of the bundling PVC, not the link status of the individual sub-multiplexed PVCs. This presents a serious impediment to bundling bursty data under a shared DLCI because a connection failure in one sub-multiplexed PVC may be incorrectly reported by the frame relay network to be the failure of each sub-multiplexed PVC in the bundle. When failure of the bundle is reported to the router, multiple connections may unnecessarily be downed. At least partly for this reason, PVCs used to carry bursty data are usually not sub-multiplexed and a large number of PVCs may be required in the frame relay network to support connection of LAN stations and other devices that transmit and receive bursty data. Consequently, the above described problems of network resource depletion, LMI status interference with voice frames and relatively costly frame relay network access remain.

SUMMARY OF THE INVENTION

A method and apparatus for communicating link status information across a frame relay network are disclosed. A first frame relay packet that includes link status information for a plurality of virtual circuits that each share a first data link connection identifier is received via a frame relay network. A second frame relay packet that conforms to a standard local management interface status message format is generated using the link status information in the first frame relay packet and then transmitted to customer premise equipment.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

Figure 1:
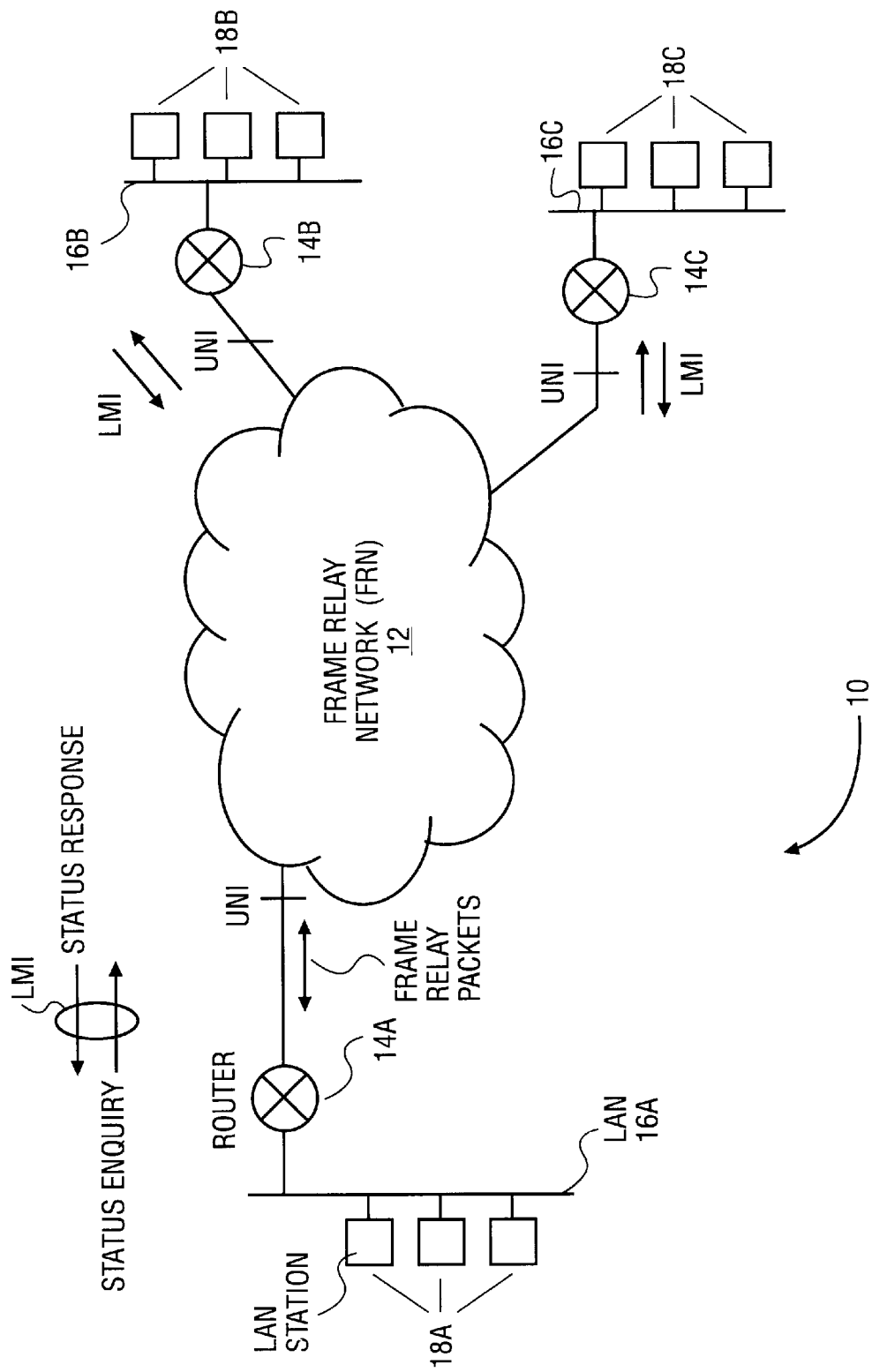
FIG. 1 depicts a prior art network configuration in which a frame relay network is used to interconnect three local area networks.
Figure 2:
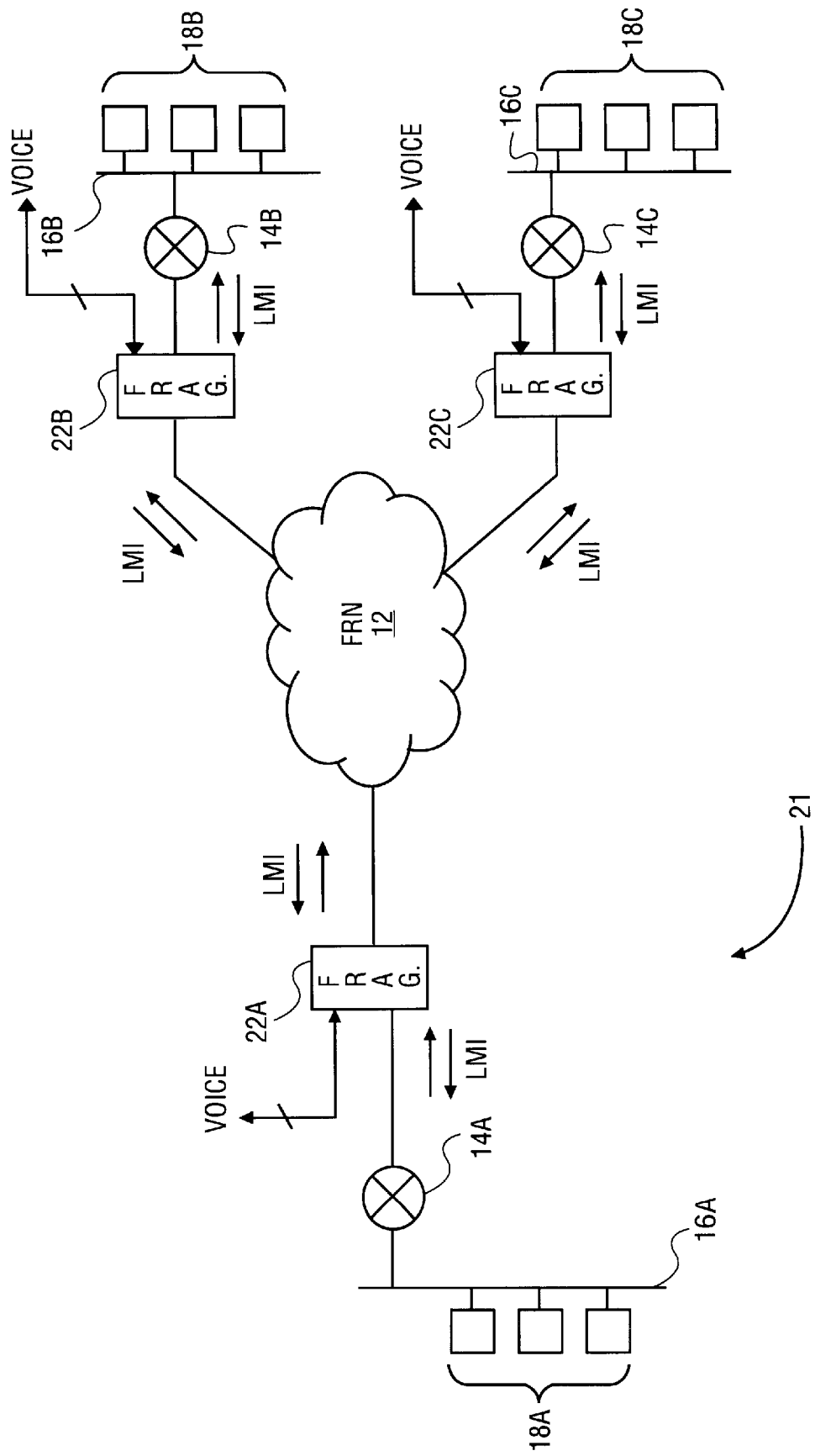
FIG. 2 illustrates a prior art network configuration that allows packetized voice to be transmitted over a frame relay network with significantly reduced jitter.
Figure 3:
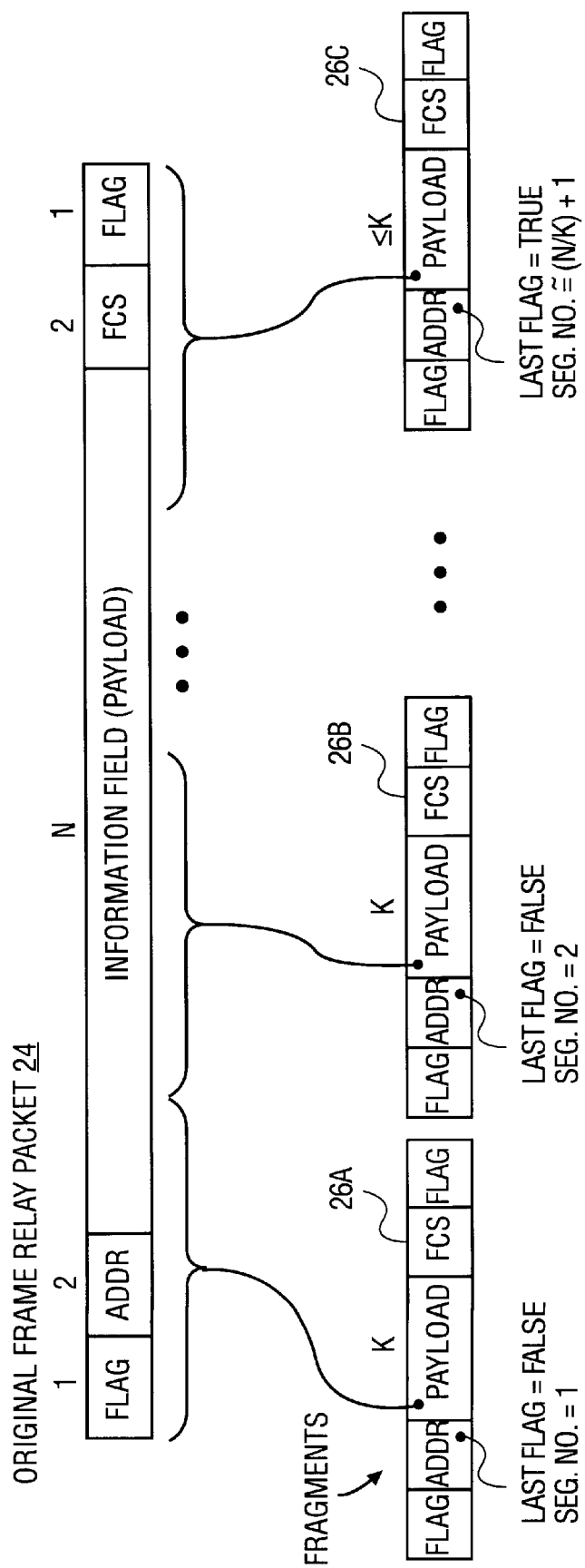
FIG. 3 illustrates decomposition of a frame relay packet into fragments according to a prior art technique.
Figure 4:
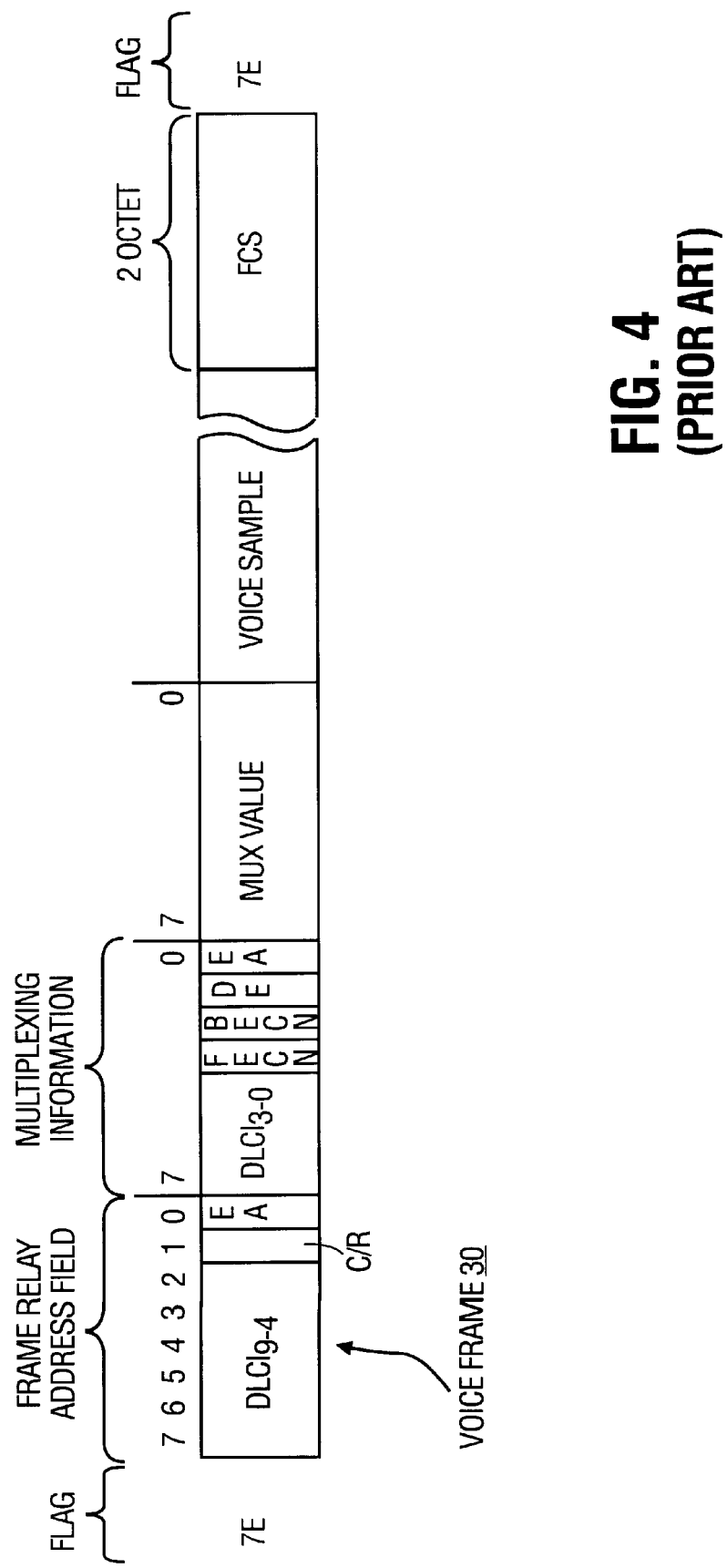
FIG. 4 is a diagram of a prior art voice frame that includes multiplexing information to allow bundling of permanent virtual circuits.

It is an intended advantage of embodiments of the present invention to avoid LMI status interference with voice frames and to reduce the cost of frame relay network access by reducing the number of PVCs carried by a frame relay network while maintaining the number of LAN station connections that can be supported. In various embodiments of the present invention, the number of PVCs carried by a frame relay network is reduced by sub-multiplexing PVCs that carry bursty data under a shared DLCI. Because the frame relay network perceives the shared DLCI as being a single PVC, the cost of network access is reduced and the size of the LMI status message is also reduced. To provide link status information for sub-multiplexed PVCs, status messages are transmitted between local and remote frame relay access devices. The local frame relay access device (FRAD) uses the link status information in the status messages to generate a specification-compliant LMI status message that is forwarded to other customer premise equipment.

To support sub-multiplexing of PVCs that carry bursty data, a local FRAD receives outbound packets from a router, inspects the destination DLCI in each packet, then modifies the address field of each packet according to the destination DLCI. The modified address field includes a bundling DLCI and multiplexing information that is determined based on the destination DLCI in the packet received from the router. As an aside, the destination DLCI is also referred to as a user DLCI because it usually corresponds a user station on a network. In one embodiment, the local FRAD also performs a fragmenting function. The local FRAD decomposes packets from the router that are longer than a predetermined length into multiple fragments, and includes the modified address field in each fragment.

When packets carried by sub-multiplexed PVCs are received in a remote FRAD, the remote FRAD uses the multiplexing information in each packet to identify the original destination DLCI and restores the original destination DLCI to the address field of the packet. When fragments are received in the remote FRAD, the remote FRAD regenerates the original packet using the respective payloads of the fragments and restores the original destination DLCI in the regenerated packet before forwarding it to the destination network. In one embodiment, the original destination DLCI is determined by indexing a look-up table using the multiplexing information included in one or more of the fragments. In another embodiment, the original destination DLCI is included in the payload of one of the fragments and copied into the address field of the regenerated packet. In either embodiment, the overall PVC from source station to destination station is segmented according to which portion of the network is carrying the PVC. The destination DLCI in the original packet defines a PVC segment carried by customer premise equipment, and a shared DLCI and multiplexing value defines a PVC segment carried by the frame relay network. The local and remote FRADs join the segmented PVCs by translating between their respective addressing fields. The overall PVC from source device to destination device is called a segmented PVC.

In one embodiment, a remote FRAD periodically issues link status messages to the local FRAD to apprise the local FRAD of the status of each of the sub-multiplexed PVCs. In one implementation, a first type of link status message called a keep alive/connection status (KACS) message is packed with connection active information and new connection information in a format that does not exceed a predetermined packet length. Another type of link status message, called a congestion management (CM) message is used to supply rate control information for each of the sub-multiplexed PVCs. Receiver-not-ready, connection deletion and connection priority information that is otherwise received in LMI status response messages from the frame relay network is instead received in one or more additional types of link status messages transmitted through the frame relay network by the remote FRAD. Upon receiving the link status information (e.g., active connection, new connection, receiver not ready status, connection deletion and connection priority information), logic within the local FRAD repackages the information in a LMI status message that is forwarded to the router. From the router's viewpoint, the sub-multiplexing of PVCs in the FRAD and through the frame relay network is transparent, and the FRAD responds to LMI status enquiry messages from the router with specification-compliant LMI status response messages. The router or other customer premise equipment is able to respond appropriately to downed and new connections and also to perform re-routing and rate control functions for congested connections.

According to one embodiment, the FRAD may be accessed via a telnet session to provide a user interface. The user may then configure the sub-multiplexing operation of the FRAD by selecting from among a predetermined set of PVC bundling options. Thus, it is an intended advantage to allow bursty data, voice data and constant bit rate data to be transmitted to a frame relay network using a shared access line. It is a further intended advantage to allow the user to select from among a number of predetermined bundling options to bundle data from various sources in respective PVCs that share a common DLCI. It is yet another intended advantage to bundle PVCs in a common DLCI to reduce the cost of transmitting information across a frame relay network and also to provide connection and congestion status information to customer premise equipment for each sub-multiplexed PVC.

Figure 5B:
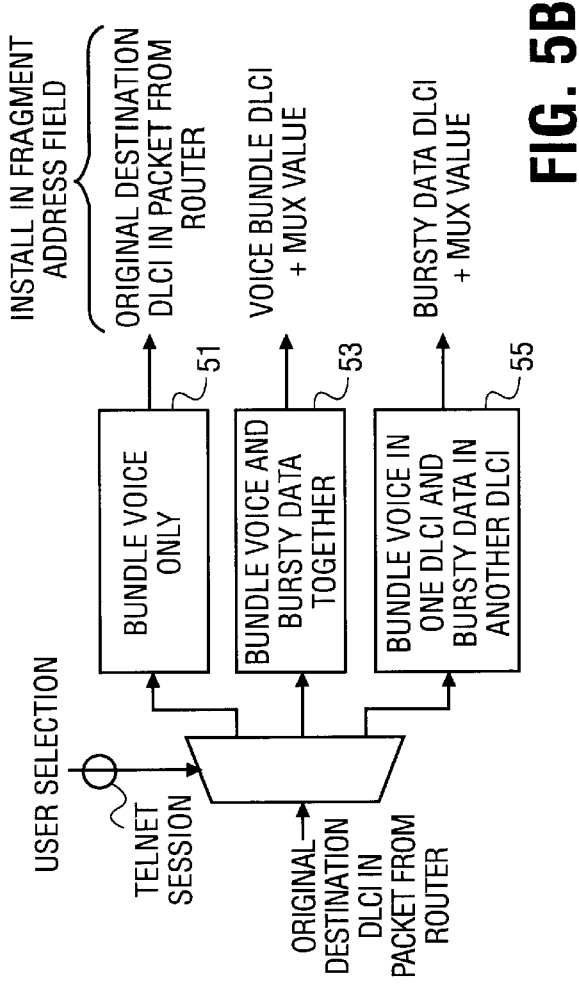
FIG. 5B illustrates user selection of the permanent virtual circuit bundling scheme according to one embodiment.
Figure 5A:
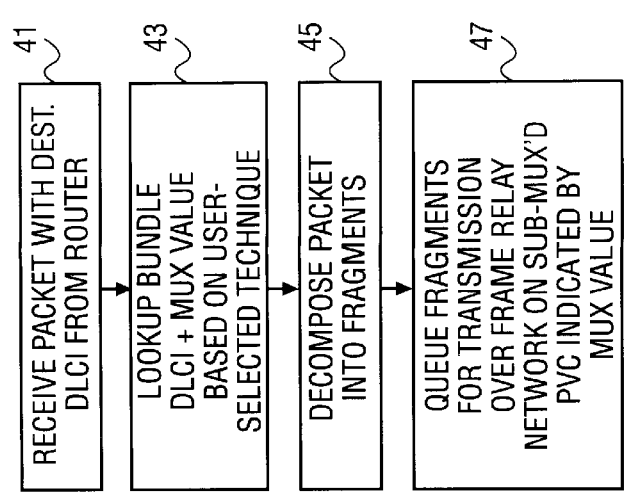
FIG. 5A is a flow diagram of bundling logic in a frame relay access device according to one embodiment.

FIG. 5A is a flow diagram of bundling logic in a FRAD according to one embodiment. The FRAD receives frame relay packets from a router or other device requesting access to a frame relay network in block 41. Each packet includes an address field that contains a DLCI. For each packet, the FRAD selects a bundling DLCI to be used to transmit the packet across a frame relay network. In one embodiment, the bundling DLCI is determined according to one of a number of bundling schemes that has been selected by a user. This is discussed below in reference to FIG. 5B. Assuming that the user has selected to bundle bursty data packets under a shared DLCI, then at block 43 the destination DLCI in each received packet is used to look up a multiplexing value in a multiplexing value table. The shared DLCI and the multiplexing value are included in packets directed to the original destination DLCI, with the shared DLCI identifying a bundling PVC and the multiplexing value identifying a sub-multiplexed PVC within the bundling PVC. By using respective multiplexing values to identify different sub-multiplexed PVCs within the bundling PVC, multiple PVCs may be established through the frame relay network, but with only one DLCI being allocated from the overall set of DLCIs available in the frame relay network.

At block 45, the packet received from the router is fragmented into multiple fragments with each fragment including the shared DLCI and the multiplexing value selected in block 43. In one embodiment, each fragment also includes a last flag to indicate to a remote FRAD when the last fragment in a sequence of fragments has been received and a sequence number to indicate the ordering of the various fragments that are to be used to regenerate the original packet. At block 47, the fragments are queued for transmission across the frame relay network in a sub-multiplexed PVC indicated by the DLCI and the multiplexing value selected in step 43.

FIG. 5B illustrates user selection of the PVC bundling scheme according to one embodiment. In one implementation, a FRAD includes an internet protocol (IP) address and is connected to a LAN so that a telnet session can be established between the FRAD and a user terminal. In the telnet session, the user is permitted to supply certain configuration parameters to the FRAD, including selection of one of a number of bundling schemes. In one embodiment, the user is permitted to specify a bundling DLCI for bursty data, a bundling DLCI for voice frames and a bundling DLCI for link status messages. This permits the user to bundle bursty data and voice separately (by specifying different bundling DLCIs) or together (by specifying the same bundling DLCI). The advantage of permitting a user to specify a bundling DLCI in this manner is that it alleviates the user from having to specify a DLCI each time a connection is added in a FRAD. The user may simply indicate the type of information to be carried on a sub-multiplexed PVC, voice or bursty data, and the bundling DLCI is automatically determined. This greatly simplifies connection management. Multiplexing values may also be automatically determined by the FRAD when a connection is added, for example, by choosing the next sequentially available multiplexing value.

Generally a user has at least the following three bundling options: (i) bundle voice inputs under a shared DLCI, but not bursty data (block 51); (ii) bundle voice inputs and bursty data packets together under a single shared DLCI (block 53); or (iii) bundle voice inputs under one shared DLCI and bursty data packets under a another shared DLCI (block 55). While option (ii) provides the lowest cost in terms of the number of DLCIs consumed in a frame relay network, option (iii) often provides better performance. One reason for this is that, except during periods of silence, voice transmission usually consumes relatively steady bandwidth and does not lend itself particularly well to being multiplexed with other transmissions. By contrast, bursty data transmissions are characterized by occasional bursts of data followed by periods of silence and are well suited to be multiplexed with one another in a bundling PVC. Bundling options may also be provided to support bundling of constant bit-rate data or other types of data.

Figure 5C:
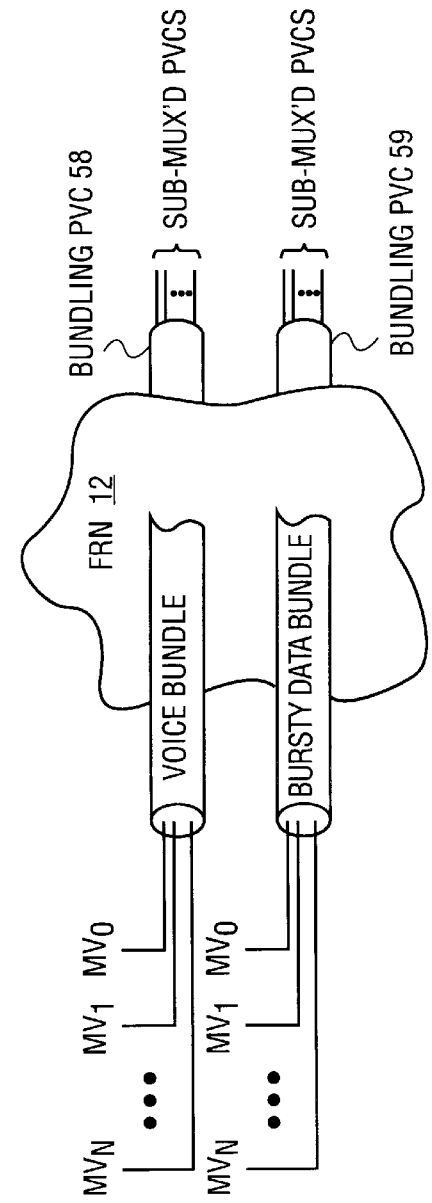
FIG. 5C illustrates bundling bursty data and voice data under respective shared data link connection identifiers for transmission across a frame relay network.

FIG. 5C illustrates bundling bursty data and voice data under respective shared DLCIs for transmission across a frame relay network 12. In effect, each shared DLCI creates a respective bundling PVC 58, 59 through which sub-multiplexed PVCs for voice and bursty data are established. The multiplexing values ($MV_0$, $MV_1$, $MV_N$) are used to distinguish the sub-multiplexed PVCs within the bundling PVCs 58, 59.

Figure 6:
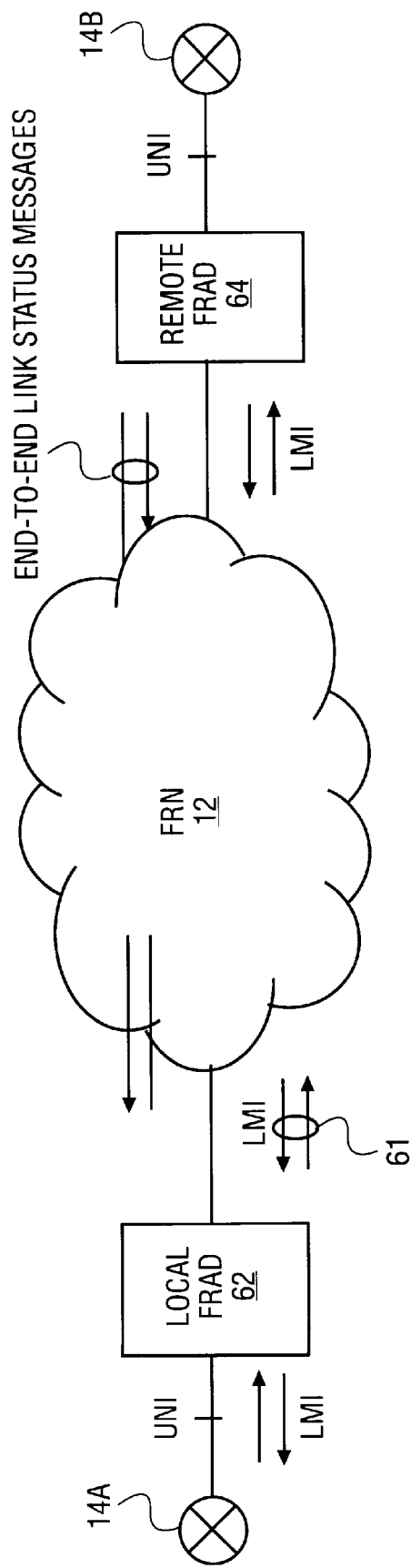
FIG. 6 illustrates one embodiment for providing link status information for each of a number of sub-multiplexed permanent virtual circuits established in a frame relay network.

FIG. 6 illustrates one embodiment for providing link status information for each of a number of sub-multiplexed PVCs established in a frame relay network 12. As discussed above, one reason that bursty data was typically not bundled in sub-multiplexed PVCs in prior art devices, is that frame relay networks usually report link status information only on a per DLCI basis. This is illustrated in FIG. 6 by the LMI per bundled PVC arrows 61 issuing between the frame relay network 12 and respective FRADs 62, 64. Because the LMI status messages do not indicate the status of sub-multiplexed PVCs, the FRADs 62, 64 do not learn the link status beyond the bundling PVC as a whole. Consequently, even if only one sub-multiplexed PVC in a bundle has failed, the failed connection will typically be interpreted and reported by the frame relay network 12 as a failure of the entire bundling PVC. Likewise, if one sub-multiplexed PVC in a bundle becomes congested, the congestion will typically be interpreted and reported by the frame relay network 12 as congestion of the entire bundling PVC.

In one embodiment, link status information for sub-multiplexed PVCs 62, 64 is provided in end-to-end link status messages that are transmitted from one side of the frame relay network 12 to the other, between local and remote FRADs 62, 64. LMI status messages are still passed to each FRAD 62, 64 by the frame relay network 12, but the sub-multiplexed PVC link status, including congestion information, is obtained from the link status messages passed between the local and remote FRADs 62, 64 using the frame relay network 12. In one embodiment, the local and remote FRADs 62, 64 may both be connected directly to LANs (e.g., via respective routers 14a, 14b). In an alternate embodiment, the remote FRAD 64 may actually be a switch node in another network such as a FastPacket network or an ATM network. In that case, the remote FRAD 64 can be designed to emulate the link management protocol used by a LAN-connected FRAD so that link status messaging can be segmented within the overall network.

Figure 7A:
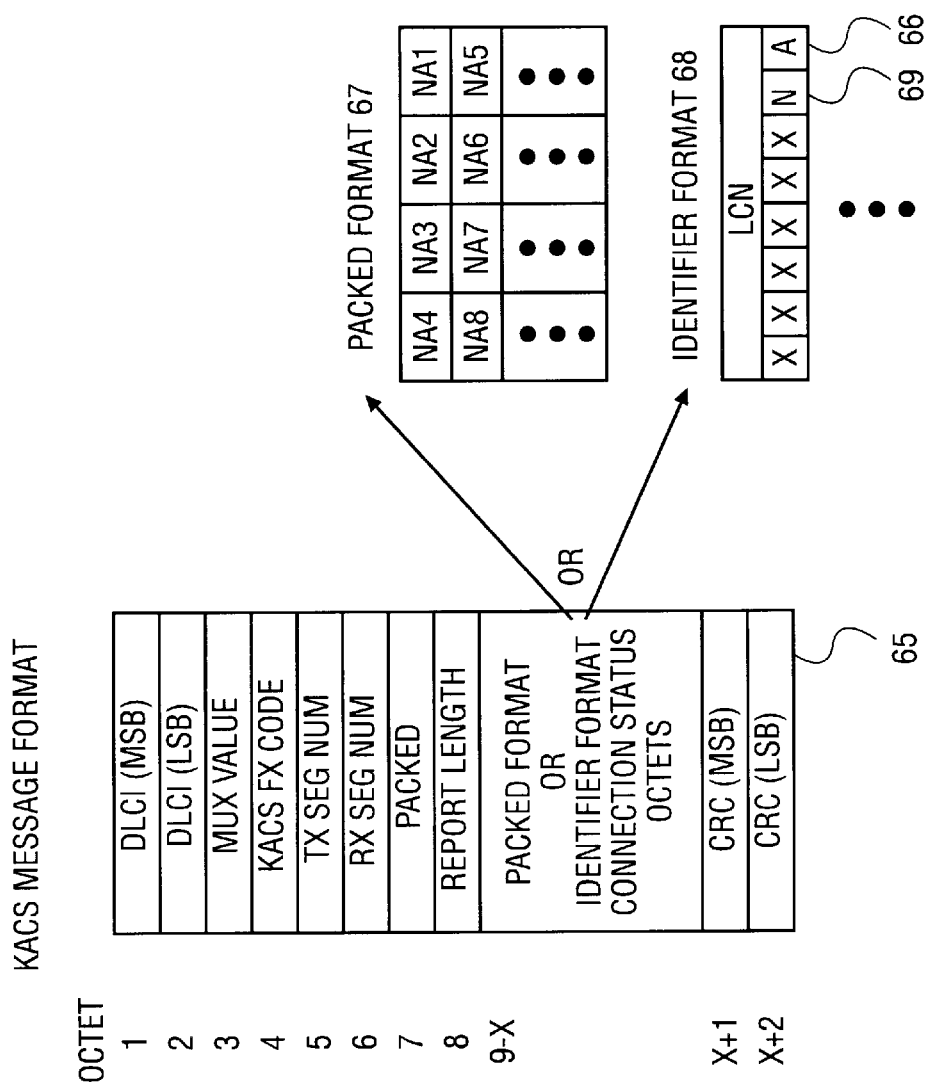
FIG. 7A illustrates the format of a keep alive/connection status message according to one embodiment.

FIG. 7A illustrates the format of a keep alive/connection status (KACS) message 65 according to one embodiment. The KACS message 65 is one type of link status message that may be transferred between local and remote FRADs on a frame relay network. In the first two octets, the KACS message 65 includes a DLCI that identifies a bundling PVC. The third octet includes a multiplexing value that identifies a sub-multiplexed link management PVC between local and remote FRADs. In one embodiment, the link management PVC is indicated by a reserved multiplexing value. The fourth octet includes a code that identifies the message 65 as a KACS message. The fifth and sixth octets are transmit and receive sequence numbers, respectively, that are used to implement a keep alive protocol. In one embodiment, a first FRAD places a transmit count in the transmit sequence number octet of each outgoing KACS message 65 and increments the transmit count after each KACS message 65 is sent. When the KACS message 65 is received by a second FRAD, the second FRAD records the value of the transmit sequence number octet and includes this value in the receive sequence number octet of the next KACS message 65 that it sends. Thus, when the first FRAD receives a KACS message 65 from the second FRAD, the first FRAD can inspect the receive sequence number octet to determine whether the last KACS message 65 that it transmitted was received by the second FRAD. The second FRAD can perform reciprocal verification of the receive sequence number octet in an incoming KACS message 65 to verify that its last transmitted KACS message 65 was received by the first FRAD.

Still referring to FIG. 7A, the seventh octet of the KACS message 65 indicates the format of connection status information placed in octets 9-X (X being variable). In one embodiment, up to 256 different sub-multiplexed PVCs may be bundled under a shared DLCI and one of two different connection status formats is used depending upon the number of sub-multiplexed PVCs actually in use. In one format, called an identifier format 68, two octets are included in the KACS message 65 per sub-multiplexed PVC that has been allocated. The first octet includes a value identifying the sub-multiplexed PVC and the second octet provides Active and New bits for the sub-multiplexed PVC. The Active bit 66 indicates whether the sub-multiplexed PVC is operating (i.e., connection added and available to handle traffic), and the New bit 69 indicates whether the sub-multiplexed PVC has been newly added by the FRAD that is packing the KACS message. In one embodiment, the first octet of the identifier format 68 is the multiplexing value that corresponds to the sub-multiplexed PVC. In an alternative embodiment, a logical connection number (LCN) is used.

The second format of the KACS is called the packed format 67. In the packed format 67, four pairs of New and Active bits are provided in each message octet. For example, the first octet in the packed format 67 includes New/Active bit pairs 1–4 (shown in FIG. 7A as NA1, NA2, NA3, NA4). Each New/Active bit pair corresponds to a single sub-multiplexed PVC, with the position of the New/Active bit pair within the packed format 67 identifying the sub-multiplexed PVC whose status is represented. For example, in one embodiment, the first received pair of New/Active bits is the connection status for the sub-multiplexed PVC that corresponds to multiplexing value 1, the second received pair of New/Active bits is the connection status for the sub-multiplexed PVC that corresponds to multiplexing value 2 and so forth until a final pair of New/Active bits for the sub-multiplexed PVC that corresponds to multiplexing value 256. As mentioned above, each multiplexing value used to indicate a sub-multiplexed PVC may have a corresponding logical channel number (LCN). In one embodiment, as each multiplexing value is allocated for an added connection, an incremental LCN is associated with the multiplexing value and therefore with the sub-multiplexed PVC. This permits the sub-multiplexed PVCs to be represented by sequentially ordered LCNs without requiring that the multiplexing values be allocated in any particular order. In one embodiment of the packed format 67, the first pair of Active/New bits corresponds to LCN 1, the second pair of Active/New bits corresponds to LCN 2 and so forth. One advantage of using LCNs to identify sub-multiplexed PVCs is that, because the LCNs are assigned in sequence, the highest numbered LCN indicates the total number of sub-multiplexed PVCs that have been allocated within a bundling PVC. Consequently, a packed-format KACS message 65 need only include the number of octets required to provide connection status through the highest numbered LCN. For example, if only sixty-four sub-multiplexed PVCs have been allocated, then only sixteen octets containing Active/New bit pairs are required to provide the Active/New connection status information for the sub-multiplexed PVCs, thereby saving bandwidth. This is true even if the distribution of the corresponding sixty-four multiplexing values is scattered throughout the 254 available values. In an alternate embodiment, the LCNs are not necessarily sequentially allocated. In this embodiment, the number of Active/New bit entries in a packed-format KACS message is determined by the maximum LCN value and not necessarily the number of allocated PVCs. Thus, even if LCN 254 was the only allocated PVC, sixty-four octets (254 LCNs/4 bit pairs per octet, rounded up to a make an even number of octets) are still required in the packed message format 67.

In one embodiment, each packet sent to the frame relay network by a FRAD is limited to a predetermined length to avoid introducing an unacceptably long delay between successive voice packets. For example, a length of seventy-seven octets (seventy payload octets, seven octets for framing, addressing and FCS) is chosen in one implementation as being a maximal length packet. It will be appreciated that if the number of PVCs in use within a shared DLCI exceeds thirty-five or thirty-six (depending on whether a five or seven octet addressing field is used), the number of octets in an identifier-formatted KACS message 65 will exceed the maximum permitted length of seventy-seven octets. In one embodiment, this problem is avoided by switching to a packed-format KACS message 65 whenever the packed format 67 will be shorter than the identifier format 68. In an embodiment where an eight bit multiplexing value is used, the maximum number of octets required to transmit Active/New bit status for each PVC is sixty-four so that the New/Active status of each sub-multiplexed PVC can be transmitted in a packed-format KACS message 65 without exceeding the seventy-seven octet maximum message length.

In one embodiment, connection status information received by a FRAD is used to set Active and New bits in an LMI status message that conforms to the Consortium or Annex D specifications. The LMI status message is then sent to the router (or other device) that is used to couple customer equipment to the FRAD. From the perspective of the router, the FRAD behaves like a frame relay network. That is, the router issues LMI status enquiry messages to the FRAD and receives LMI status messages in response. In this way, the FRAD shields the router from the sub-multiplexing of PVCs under a shared DLCI and the end-to-end status messages passed between the local and remote FRADs to obtain link status for the sub-multiplexed PVCs.

Figure 7B:
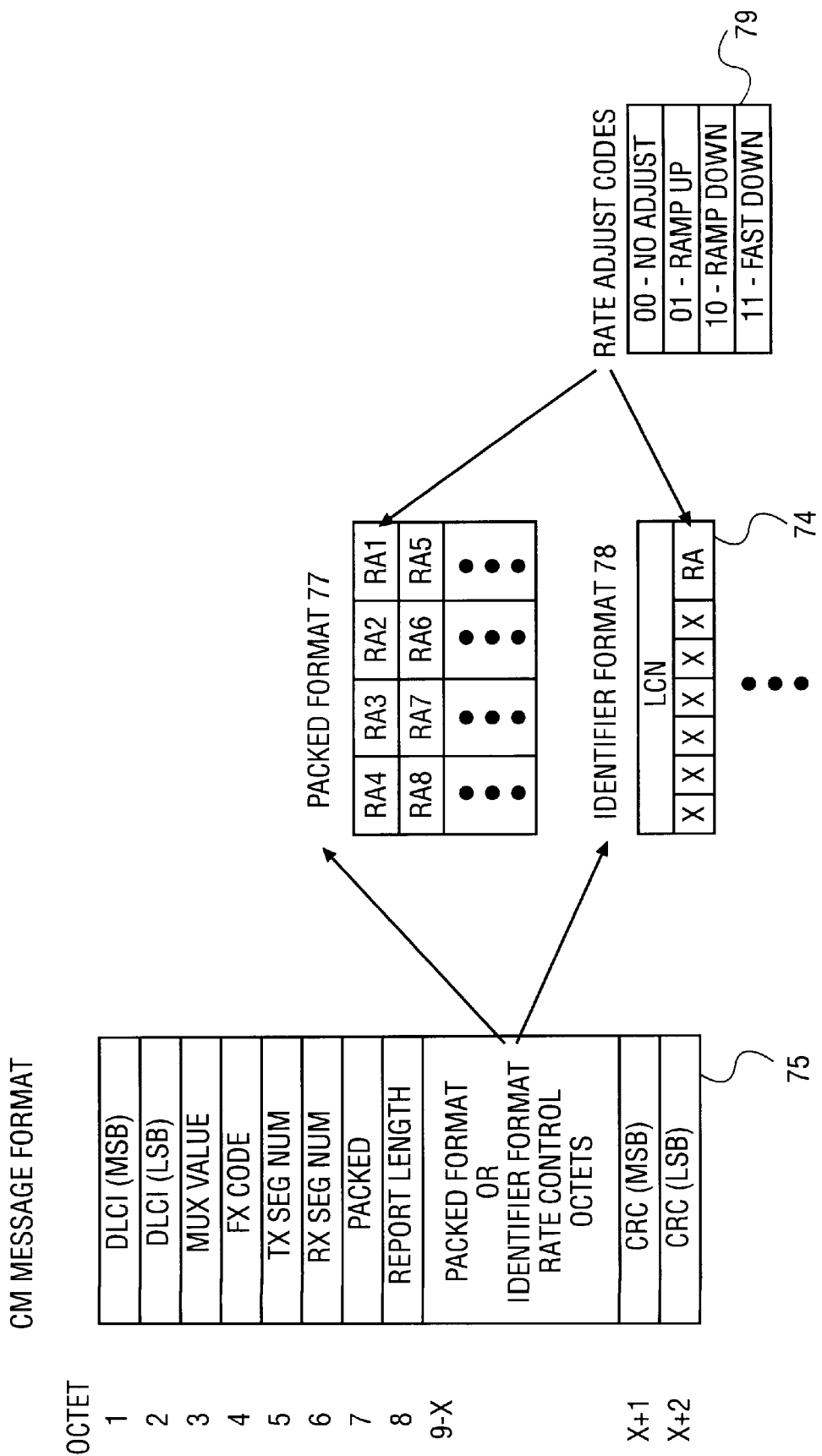
FIG. 7B illustrates the format of a congestion management message according to one embodiment.

FIG. 7B illustrates the format of a congestion management (CM) message 75 according to one embodiment. The CM message 75 is another type of link status message that may be transferred between local and remote FRADs on a frame relay network. In one embodiment, the first eight octets and the final two octets of the CM message 75 are identical to the first eight octets and the final two octets of the KACS message described above, except that the function code in the fourth octet indicates a CM message 75 instead of a KACS message. Instead of connection status information in octets 9-X, however, the CM message 75 contains two-bits of rate control information for each sub-multiplexed PVC. These bits are referred to as rate adjust (RA) bits and indicate whether the rate at which packets are queued for transmission on a particular sub-multiplexed PVC should be ramped up, ramped down, ramped down fast, or not adjusted. An exemplary diagram of RA bit encoding is shown in table 79 of FIG. 7B. As with the New/Active bit pairs in the KACS message, the RA bits are provided in the CM message 75 according to either a packed format 77 or an identifier format 78 depending on which is shorter. The packed format 77 is as described above in reference to FIG. 7A, except that RA bits are packed instead of New/Active bits. In the packed format 77, pairs of RA bits are packed together within the CM message 75 without being accompanied by explicit sub-multipexed PVC identifiers. Instead, each pair of RA bits is associated with a sub-multiplexed PVC according to its respective position within the bitstream of the CM message 75. The identifier format 78 is also as described above in reference to FIG. 7A, except that a pair of RA bits 74 is provided in the second octet instead of an New/Active bit pair.

Figure 8:
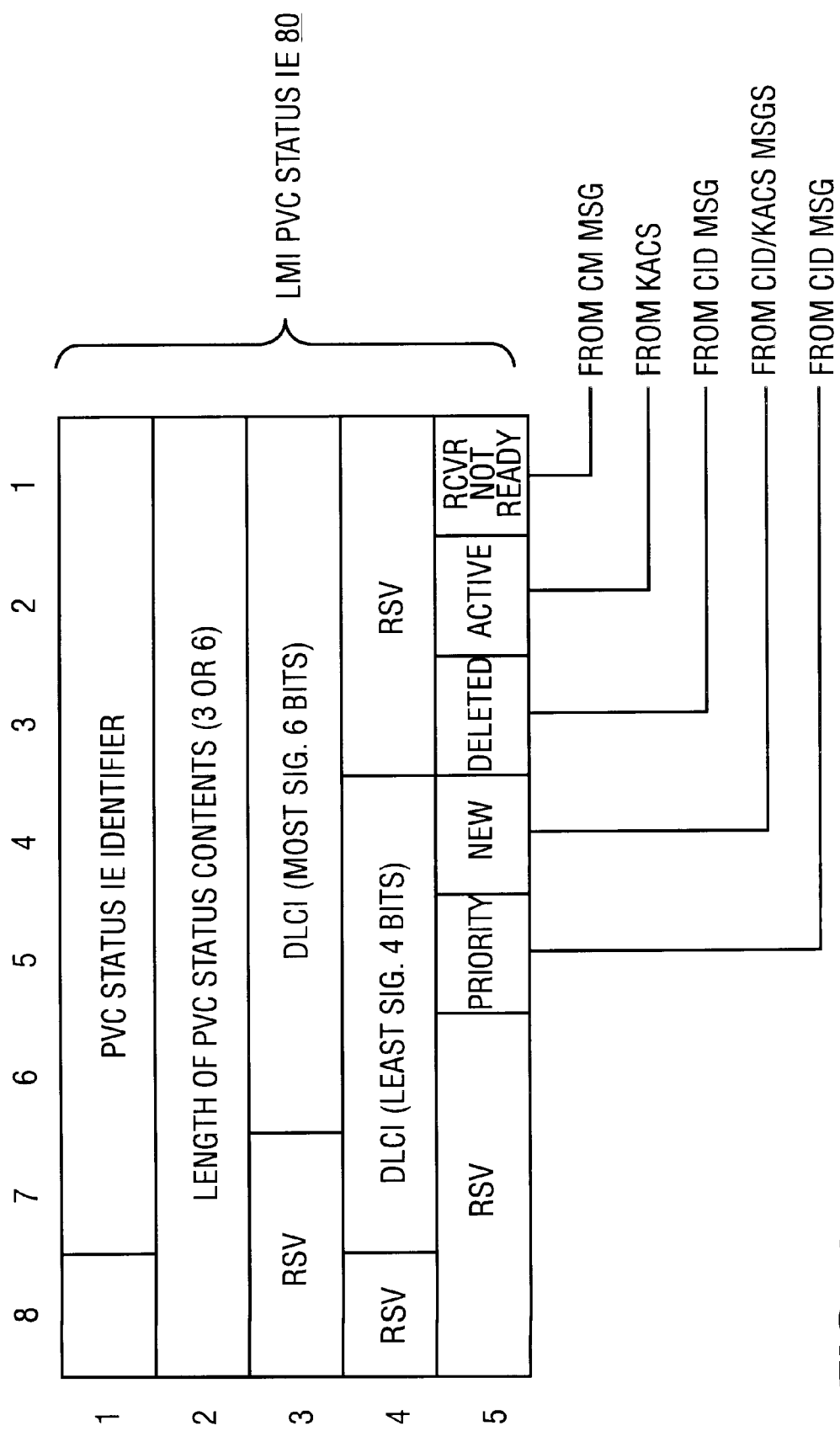
FIG. 8 illustrates the packing of an Local Management Interface status message according to one embodiment based on link status messages received from a remote frame relay access device.

FIG. 8 illustrates the packing of an LMI status message according to one embodiment based on link status messages received from a remote FRAD. As shown in FIG. 8, the Consortium and Annex D LMI protocols each specify a five octet information element (IE) called a "PVC status IE" 80 that is part of a full LMI status message. Under the Consortium LMI specification, three additional octets may optionally be included in the PVC status IE 80 to indicate the minimum bandwidth allocated to the identified PVC.

The first octet in the PVC status IE 80 contains an identifier (07) to identify the IE as a PVC Status IE. The second octet indicates the length of the PVC status contents (i.e., the number of octets to follow—three or six, depending on whether the three bandwidth octets are included). The third and fourth octets include the most significant six bits and least significant four bits, respectively, of the DLCI to which the LMI status message pertains. The fifth octet includes five link status bits: Priority, New, Deleted, Active, and Receiver-Not-Ready. As discussed above, because the frame relay network equates each DLCI with a respective PVC allocated to the FRAD, the link status bits received in a LMI status message from the frame relay network indicate the link status of a bundling PVC, not the link status of the sub-multiplexed PVCs within the bundle.

In one embodiment, three types of link status messages are passed from a remote FRAD to a local FRAD and used to set the five status bits in LMI status messages: KACS messages and CM messages, discussed above, and also connection identification (CID) messages. As discussed above, the New and Active bits are received in KACS messages transferred between the near and remote FRADs. The CID message is transmitted by a remote FRAD in response to a connection event such as adding or deleting a connection and is used by the receiving FRAD to set or clear the Priority, New and Deleted bits. For example, if a connection is added at a remote FRAD, then the remote FRAD transmits a CID message indicating the added connection (the connection including, for example, a PVC between the remote FRAD and a remote router and a sub-multiplexed PVC through the frame relay network) and indicating whether the connection is to receive priority in the remote FRADs ingress and egress queues. When the CID message is received at the local FRAD, the local FRAD sets the New bit and sets or clears the Priority bit in the next LMI status message sent to the local router. Similarly, the remote FRAD will transmit a CID message upon deletion of a connection and the CID message, when received, is used to set the Deleted bit in the LMI status message sent to the local router.

As discussed above, the CM message is transmitted to indicate whether a sub-multiplexed PVC is congested. If the CM message indicates that the sub-multiplexed PVC is congested (e.g., RA=Ramp Down or Fast Down), the local FRAD will set the Receiver-Not-Ready bit in the next LMI status message sent to the local router. Using this technique, the customer premise equipment is able to make congestion management decisions for each sub-multiplexed PVC, even though the LMI status information provided by the frame relay network indicates only the congestion state of the overall bundling PVC. For example, the router may choose to re-route traffic intended for a particular destination through another connection or provide feedback to a source LAN station to throttle the output of the LAN station. These and other techniques for performing rate control on sub-multiplexed PVCs is made possible by the end-to-end rate control information supplied on the CM messages.

Figure 9:
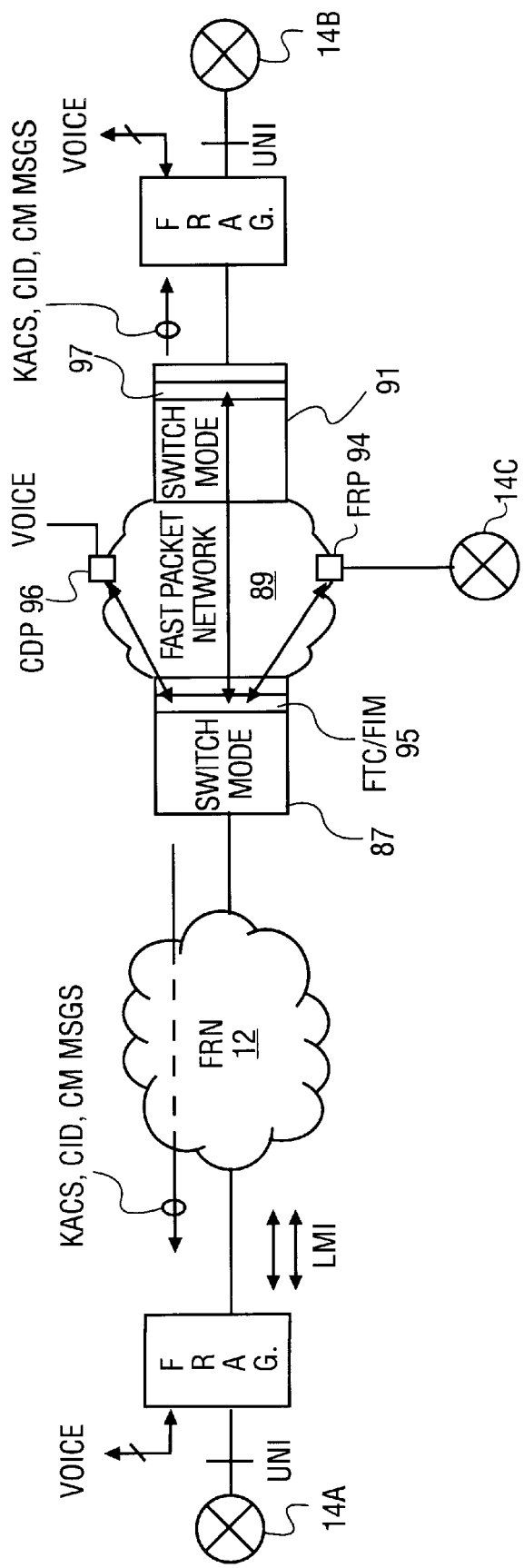
FIG. 9 illustrates a network configuration according to an embodiment in which a first fragmenter is coupled to a router and to a first switch node of a FastPacket network.

In an embodiment where the local and remote FRADs are each coupled to respective routers and each perform a PVC bundling function, the transmission of KACS, CM and CID messages is performed by both the local and remote FRADs so that link status information is passed in both directions. In alternate embodiments, however, multiple wide area networks, including one or more frame relay networks, may need to be traversed to transfer a frame relay packet to its destination. In such cases, the remote FRAD may be an intermediate point in an internetwork path and therefore may not need to receive link status information from the local FRAD. For example, FIG. 9 illustrates a network configuration according to an embodiment in which a first fragmenter 85 is coupled to a LAN router 14*a* and, via a frame relay network 12, to a first switch node 87 of a FastPacket network 89. The network configuration includes a second fragmenter 93 that is directly connected to a second switch node 91 on the FastPacket network 89 and to a LAN router 14*b*. Voice and data destinations may exist at the LAN router ends of the network or on nodes within the FastPacket network 89 such as a frame relay packet assembler/ disassembler (FRP) 94 for receiving bursty data FastPackets, a channelized data packet assembler/ disassembler (CDP) 96 for receiving voice FastPackets or another FastPacket device.

In the network configuration of FIG. 9, the first fragmenter 85 is a local FRAD and the first switch node 87 on the FastPacket network 89 is a remote FRAD. In one embodiment, the first switch node 87 includes a specialized port module called a frame trunk module (FTM) 95 that supports receipt of sub-multiplexed PVCs and returns KACS, CID and CM messages to the local FRAD 85 to provide the local FRAD with link status information. The first switch node 87 and the second switch node 91 transmit link status information to one another via a FastPacket connection management protocol and the first switch node 87 does not need to receive link status information from the first fragmenter 85. Consequently, the transfer of link status information across the frame relay network 12 is asymmetric when configured in this way, although the keep alive portion of a KACS message (i.e., transmit and receive sequence numbers) is still transmitted from the first fragmenter 85 to the first switch node 87. The second switch node transmits the KACS, CID and CM messages to the second fragmenter 93 as described above, although no frame relay network is traversed.

The FTM 95 converts frame relay packets received from the frame relay network 12 into fixed length cells called fastpackets and addresses the fastpackets according to the destination DLCI and multiplexing information in the frame relay packets. Depending on their addresses, fastpackets may be sent to the CDP 96, the FRP 94 or to a remote FTM module 97 in remote switch node 91. The CDP 96 is typically used to convert voice packets to audio signals that can be forward to telephony equipment and the FRP 94 is typically connected to supply frame relay frames to a router 14*c*. The remote FTM 97 may be connected to a remote fragmenter 93 via another network (including a frame relay network) or directly to the remote fragmenter 93. In either case, the remote FTM 97 supplies link status information to the remote fragmenter 93 via KACS, CID and CM messages. Both the local fragmenter 85 and the remote fragmenter 93 are typically connected to LAN routers 14*a* and 14*b*.

Figure 10:
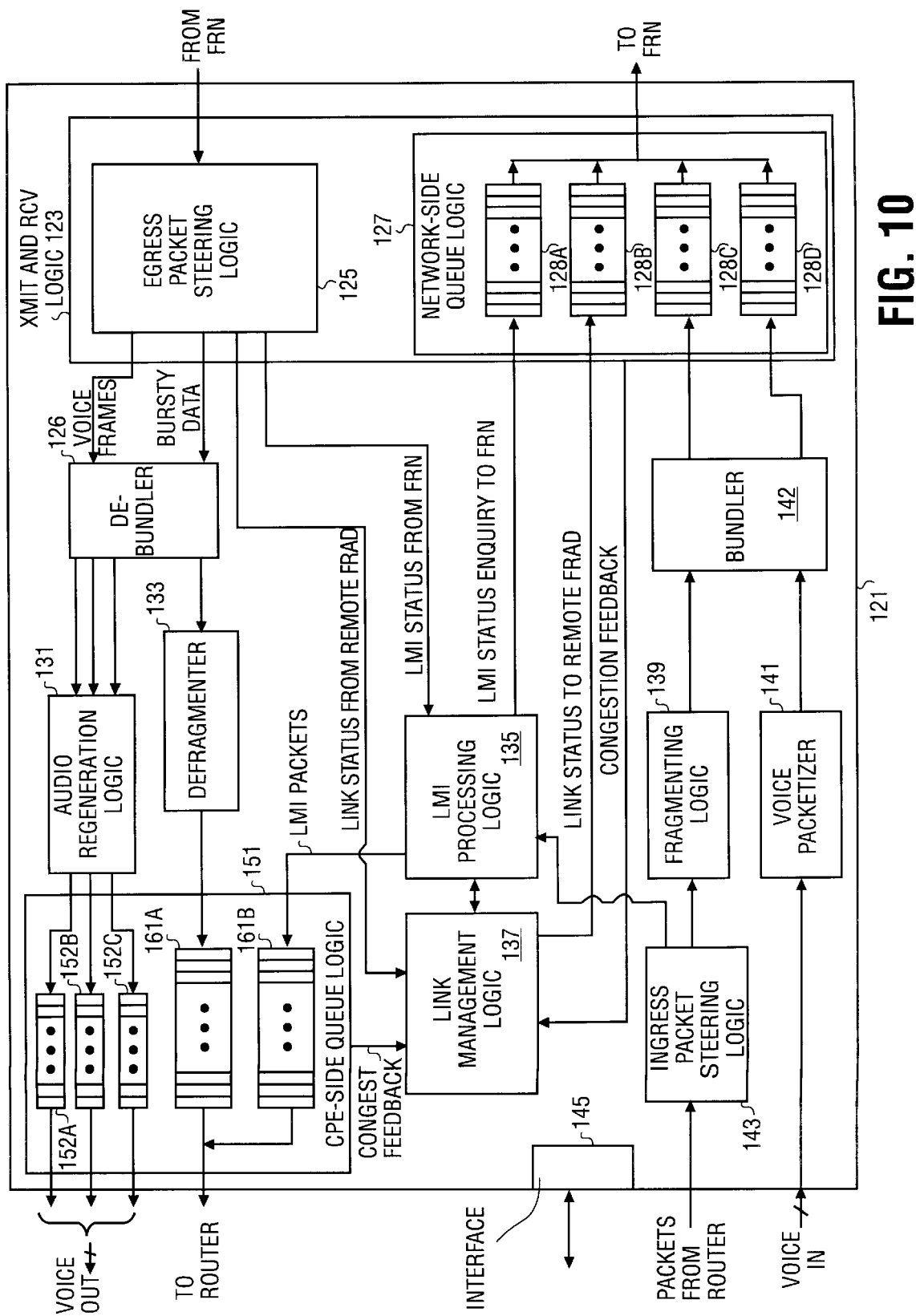
FIG. 10 is a block diagram of a frame relay access device according to one embodiment.

FIG. 10 is a block diagram of a frame relay access device 121 according to one embodiment. The frame relay access device 121 performs ingress and egress functions with respect to a frame relay network, the ingress direction being toward the frame relay network and the egress direction being away from the frame relay network. Voice inputs, bursty data packets and LMI status enquiry packets received from customer premise equipment are processed and forwarded in an ingress direction to the frame relay network.

Conversely, voice frames, bursty data packets and LMI status information from the frame relay network is processed and forwarded in an egress direction to customer premise equipment.

Frame relay packets supplied by a router or other customer premise equipment are first received in ingress packet steering logic 143. The ingress packet steering logic 143 determines whether each packet is a LMI status enquiry message or a data packet (e.g., a bursty data packet or a constant-bit-rate data packet) and forwards the packet to either LMI processing logic 135 or fragmentation logic 139 accordingly. Packets forwarded to the fragmentation logic 139 are fragmented into frame relay packet fragments and then forwarded to a bundler 142. The bundler 142 installs a shared DLCI and a multiplexing value in the address field of each incoming fragment and then forwards the fragment to network-side queue logic 127 within the transmit and receive logic 123. The network-side queue logic 127 queues the fragment in a queue (e.g., queue 128*c*) for eventual transmission to the frame relay network via one or more trunk lines.

If a LMI status enquiry packet is received in the ingress packet steering logic 143, the packet is forwarded to the LMI processing logic 135. In one embodiment, the LMI processing logic 135 forwards the LMI status enquiry packet to the network-side queue logic 127 where it is queued for transmission to the frame relay network (e.g., in queue 128*a*). In an alternate embodiment, the LMI processing logic 135 periodically issues LMI status enquiry packets to the frame relay network independently of LMI status enquiry packets received from the ingress packet steering logic 143. When LMI processing logic 135 receives an LMI status enquiry packet from the ingress packet steering logic 143, the LMI processing logic 135 holds the LMI status enquiry packet until the status information needed to generate an LMI status message has been received. The LMI processing logic 135 then copies a transmit sequence number from the LMI status enquiry message into a receive sequence number field of the LMI status message before queuing the LMI status message for transmission to the router.

In one embodiment, the frame relay access device 121 receives voice inputs and packetizes them into voice frames in a voice packetizer 141. In the case of analog voice inputs, the voice packetizer 141 digitizes the voice inputs before wrapping them in voice frames. The voice frames are forwarded to the bundler 142 which installs a shared DLCI and a multiplexing value in the their respective address fields. The bundled voice frames are then forwarded to the network-side queue logic 127 where they are queued (e.g., in queue 128d) for transmission via the frame relay network.

Frame relay packets from the frame relay network are received in egress packet steering logic 125 within the transmit and receive logic 123. The egress packet steering logic 125 determines whether the packets are voice frames, bursty data packets, link status packets (e.g., KACS, CM or CID messages) or LMI status packets and forwards them accordingly to either audio regeneration logic 131, a defragmenter 133, link management logic 137 or the LMI processing logic 135.

Packets destined for the audio regeneration logic 131 and defragmenter 133 are first received in a debundler 126 which strips the shared DLCI and multiplexing values from the packets. In one embodiment, the debundler 126 forwards the debundled voice frames to the audio regeneration logic 131 via separate inputs according to which voice output the voice frames correspond. In an alternate embodiment, the debundler 126 delivers the debundled voice frames to the audio regeneration logic 131 via a shared input, but assigns tags to the voice frames to indicate the voice outputs to which they correspond.

The audio regeneration logic extracts digitized voice samples from the voice frames and queues them in queues 152a, 152b and 152c within the CPE-side queue logic 151 for output on respective voice out lines. In one embodiment, the CPE-side queue logic includes logic to convert the queued voice samples into analog voice signals (e.g., amplitude modulated carriers) before they are output to voice equipment such as lines of a private branch exchange (PBX). In an alternate embodiment, the digitized voice samples are output from the frame relay access device 121 and are restored to analog voice signals by other customer premise equipment.

The defragmenter 133 reassembles groups of frame relay packet fragments into frame relay packets that were fragmented in a remote frame relay access device. The original destination DLCI (i.e., user DLCI) is obtained from the payload of one of the frame relay packet fragments and installed as the user DLCI of the reassembled packet. Frame relay packets having respective user DLCIs are then output from the defragmenter 133, queued in the CPE-side queue logic 151 (e.g., in queue 161a) and then forwarded to a router or other customer premise equipment.

The LMI processing logic 135 receives LMI status packets from the egress packet steering logic 125 and uses the LMI status packets to produce an LMI status packet for forwarding to the customer premise equipment. As previously mentioned, the LMI status response messages from the frame relay network provide connection and congestion status information only for the bundling PVCs as a whole, and not for the sub-mulitplexed PVCs. As described above, connection and congestion status information for the sub-multiplexed PVCs is instead received in link status packets transmitted by a remote frame relay access device.

In one embodiment, the egress packet steering logic 125 forwards link status packets to the link management logic 137. The link management logic 137 extracts the link status information from the packets and organizes the individual connection status and congestion status bits according to the sub-multiplexed PVC to which they pertain. Later, when the LMI processing logic 135 has received an LMI status message, the LMI processing logic 135 is able to obtain the connection status and congestion status for each of the sub-multiplexed PVCs from the link management logic 137. The LMI processing logic 135 then reconstructs an LMI message using the appropriate user DLCI for each customer premise equipment destination. The connection status and congestion status for each of the sub-multiplexed PVCs may then be provided in an information element that contains the corresponding user DLCI.

In one embodiment, the frame relay access device includes an interface 145 for receiving user commands including commands to provide status information and various configuration commands. In one implementation, the interface 145 is a serial interface that can be used to receive and send information to a remote user. Using such an interface, the frame relay access device may be coupled to a remote user terminal so that the user may enter configuration commands and requests for status without having to be located near the frame relay access device. Other types of interfaces may be used to receive configuration and status commands from a remote user without departing from the spirit and scope of the present invention.

As discussed above, a user-supplied configuration parameter is used, in at least one embodiment, to determine the manner in which bursty data packets and voice frames are bundled in bundling PVCs. In one embodiment, the configuration parameters are stored in a memory that is accessible to various logic elements within the frame relay access device 121, including the fragmenting and bundling logic 139 and the voice packetizer 141. Depending on the bundling configuration selected by the user, the bursty data packets may be sub-multiplexed under a shared DLCI or they may instead be transmitted to the frame relay network using respective user DLCIs. Further, if the bursty data packets are sub-multiplexed under a shared DLCI, they may be sub-multiplexed under the same shared DLCI that is used to bundle sub-multiplexed voice PVCs.

Figure 11:
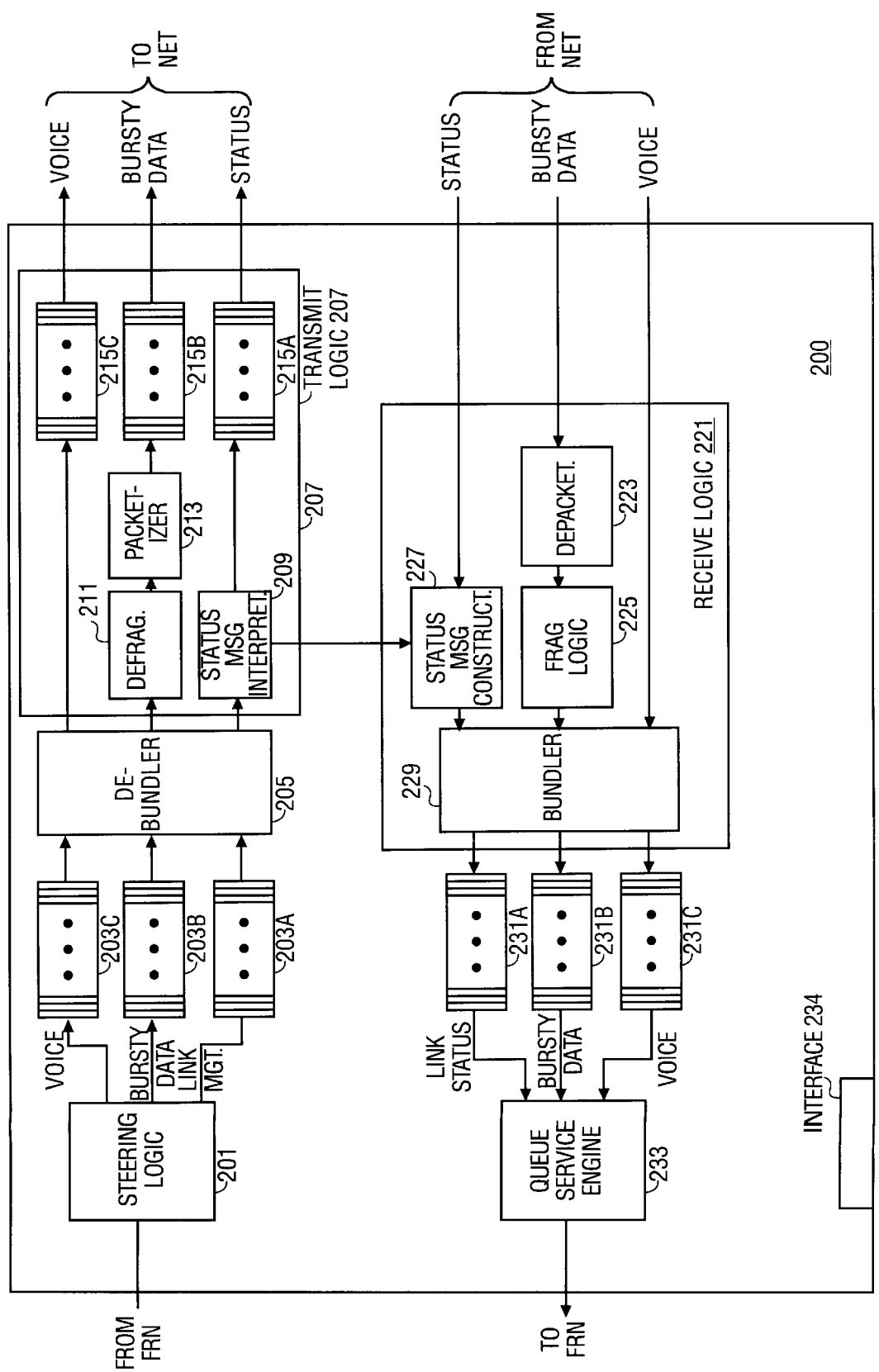
FIG. 11 is a block diagram of an embodiment of a frame relay access device that also functions as a switch node on a cell relay network

FIG. 11 is a block diagram of an embodiment of a frame relay access device 200 that also functions as a switch node on a cell relay network (e.g., a FastPacket network or ATM network). Packets received from the frame relay network are steered into one of three queues 203a, 203b, 203c by steering logic 201 depending on whether they are voice frames, bursty data packets or link management packets (e.g., KACS, CID and CM messages). Packets are removed from the head of the queues 203a, 203b, 203c by a debundler 205. The debundler 205 strips off the frame relay framing information, including the DLCI and multiplexing value and forwards the packets to transmit logic 207. In the case of voice frames, the voice payload is forwarded directly to a queue 215c for transmission across the cell relay network. In one embodiment, voice frames are originally packetized (e.g., in the packetizing logic 141 of FIG. 10) so that they have the proper payload size for transmission across the cell relay network. In an alternate embodiment, repacketizing of voice frames may be necessary.

Bursty data packets are output from the debundler 205 to a defragmenter 211 which reassembles the frame relay packet fragments into an original frame relay packet. The original frame relay packet is then forwarded to a packetizer 213 which disassembles the frame relay packet into a plurality of cells (e.g., FastPackets or ATM cells). The cells are then forwarded to a queue 215b for eventual transmission via the cell relay network.

Link status packets are output from the debundler 205 to a status message interpreter 209. The status message interpreter 209 reformats the connection status or congestion status information (depending on whether the frame relay packet was a CM, CID or KACS message) into an appropriate status message format for the cell relay network. The resulting status cells (e.g., supervisory FastPackets in a FastPacket network) are then queued in a queue 215*a* for transmission via the cell relay network. To support keep alive messaging, the status message interpreter 209 provides the transmit sequence number from packets that include keep alive information (e.g., KACS and CM messages) to a status message constructor 227. The operation of the status message constructor 227 is discussed below.

Cells are received from the cell relay network by receive logic 221. In one embodiment, voice cells are sent directly to a bundler 229 which wraps the voice information in a voice frame that includes a DLCI and multiplexing value. The voice frame is queued in a queue 231c for output to the frame relay network.

Cells carrying bursty data are received in a depacketizer 223 within the receive logic 221. The depacketizer 233 reassembles contents of incoming cells into a frame relay frame. The frame relay frame is then fragmented into frame relay packet fragments in fragmenting logic 225. The frame relay packets are then processed by bundler 229 which installs a DLCI and multiplexing value in the address field of each fragment. The fragments are then queued in queue 231*b* for transmission across the frame relay network.

Cells carrying status information (e.g., supervisory cells in a FastPacket network) are received in a status message constructor 227 where they are used to construct KACS, CID and CM messages. For KACS messages, CM messages and other status messages that include a receive sequence number field, a transmit sequence number received from the status message interpreter 209 is copied into the receive sequence number field of the link status message being constructed. Completed status messages are sent to bundler 229 which installs a DLCI and multiplexing value in the address field of each status message to produce a corresponding link status packet. The link status packets are then queued in queue 231*a* for transmission on the frame relay network.

In one embodiment, the frame relay access device 200 includes an interface 234 for receiving user-input. As with the bundler of the frame relay access device discussed in reference to FIG. 10 (i.e., element 142), the bundler 209 of frame relay access device 200 may be configured to install one or more shared DLCIs to packets according to a user-selected bundling scheme. This greatly simplifies addition of connections in the frame relay access device 200 because, once the user has indicated the manner in which different types of packets are to be bundled, the user need only indicate the type of data to be carried on a connection being added and the frame relay access device 200 can automatically assign the appropriate shared DLCI. The user need not specify the DLCI of each new connection that is added. Multiplexing values may also be automatically assigned.

Packets that have been queued in queues 231*a*, 231*b*, 231*c* are popped off the head of the queues by a queue service engine 233 and transmitted via the frame relay network. In one embodiment, the queue service engine 233 is used to enforce a priority scheme in which link status packets are given top priority, voice packets are given second priority and bursty data packets are given lowest priority. Other priority schemes may be implemented in alternate embodiments, including fairness algorithms to ensure that no one queue is serviced to the exclusion of other queues.

Having described various embodiments of apparatuses for practicing the present invention, it is noted that the individual logical functions within the apparatuses may be implemented by a general purpose processor programmed with instructions that cause the processor to perform the logical functions, specific hardware components that contain hard-wired logic for performing the logical functions, or any combination of programmed general purpose computer components and custom hardware components. Nothing disclosed herein should be construed as limiting the present invention to a single embodiment wherein the logical functions are performed by a specific combination of hardware components.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. A method comprising:

receiving via a frame relay network a first frame relay packet that includes link status information for a plurality of virtual circuits that each share a first data link connection identifier;

generating a second frame relay packet that conforms to a standard local management interface status message format using the link status information in the first frame relay packet; and transmitting the second frame relay packet to customer premise equipment.

2. The method of claim 1 wherein transmitting the second frame relay packet comprises transmitting the second frame relay packet to a router that is connected to a local area network.

3. The method of claim 1 wherein receiving a first frame relay packet that includes link status information comprises receiving a first frame relay packet having link status bits that are positioned at respective bit positions in a stream of bits that constitute the first frame relay packet, each of the respective bit positions corresponding a respective one of the plurality of virtual circuits.

4. The method of claim 1 wherein receiving a first frame relay packet that includes link status information comprises receiving link status bits that are associated with the plurality of virtual circuits according to their respective bit positions in the first frame relay packet.

5. The method of claim 1 wherein receiving a first frame relay packet comprises receiving a plurality of identifiers that each identify a respective one of the plurality of virtual circuits, each of the plurality of identifiers being arranged with a portion of the link status information that pertains to the identified one of the plurality of virtual circuits.

6. The method of claim 1 wherein the link status information includes connection status bits that indicate for each of the plurality of virtual circuits whether the virtual circuit is active.

7. The method of claim 1 wherein the link status information includes congestion status bits that indicate for each of the plurality of virtual circuits whether the virtual circuit is congested.

8. The method of claim 1 further comprising:

packing the first frame relay packet with link status information according to either a first format or a second format depending on which is more compact; and transmitting the first frame relay packet via the frame relay network.

9. The method of claim 8 wherein packing the first frame relay packet according to the first format comprises packing link status bits in respective bit positions of the first frame relay packet to indicate to which of the plurality of virtual circuits each of the link status bits pertains.

10. The method of claim 8 wherein packing the first frame relay packet according to the second format comprises packing link status bits together with identifying values that indicate to which of the plurality of virtual circuits each of the link status bits pertains.

11. The method of claim 1 wherein generating the second frame relay packet comprises including in the second frame relay packet a respective data link connection identifier for each of the plurality of virtual circuits that share the first data link connection identifier.

12. A method comprising:
receiving from a first routing device a first frame relay frame having a first data link connection identifier and a second frame relay frame having a second data link connection identifier, the first data link connection identifier being different from the second data link connection identifier;
looking up a first multiplexing value and a second multiplexing value from respective look-up table entries indicated by the first data link connection identifier and the second data link connection identifier; and
transmitting contents of the first frame relay frame across a frame relay network in third frame relay frame that includes a third data link connection identifier and the first multiplexing value; and
transmitting contents of the second frame relay frame across the frame relay network in a fourth frame relay frame that includes the third data link connection identifier and the second multiplexing value.

13. The method of claim 11 further comprising the steps of
receiving the third frame relay frame and the fourth frame relay frame;
looking up the first data link connection identifier and the second data link connection identifier from respective look-up table entries indicated by the first and second multiplexing values in the third frame relay frame and the fourth frame relay frame, respectively; and
transmitting contents of the third frame relay frame to a second routing device in a fifth frame relay frame that includes the first data link connection identifier.

14. A method comprising:
receiving a first frame relay packet that includes link status information for each of a plurality of permanent virtual circuits that share a common data link connection identifier;
looking up respective data link connection identifiers for the plurality of permanent virtual circuits; and
transmitting the looked-up data link connection identifiers and the link status information to a routing device in a second frame relay packet.

15. The method of claim 14 wherein the second frame relay frame is organized into respective information elements, each information element including a respective one of the looked-up data link connection identifiers and the link status information for a respective one of the plurality of virtual circuits.

16. The method of claim 14 wherein the second frame relay frame conforms to a standard local management interface status message format.

17. A frame relay access device comprising:
receive logic to receive via a frame relay network a first frame relay packet that includes link status information for a plurality of virtual circuits that each share a first data link connection identifier;
status message generation logic to generate a second frame relay packet that conforms to a standard local management interface status message and that includes the link status information in the first frame relay packet; and
a transmitter to transmit the second frame relay packet to customer premise equipment.

18. The frame relay access device of claim 17 further comprising audio regeneration logic to receive via the frame relay network voice frames that contain digitized audio signals and to generate audio frequency analog signals therefrom.

19. The frame relay access device of claim 17 wherein the status message generation logic includes logic to inspect a value in the first frame relay packet to determine whether the linked status information in the first frame relay packet is in a first format or a second format.

20. The frame relay access device of claim 17 wherein the status message generation logic includes logic to include in the second frame relay packet a respective data link connection identifier for each of the plurality of virtual circuits that share the first data link connection identifier.

21. The frame relay access device of claim 17 wherein the status message generation logic is at least partly implemented by a programmed processor.

22. The frame relay access device of claim 17 wherein the link status information includes connection status information indicating for each of the plurality of virtual circuits whether the virtual circuit is active.

23. The frame relay access device of claim 17 wherein the link status information includes congestion status information indicating for each of the plurality of virtual circuits whether the virtual circuit is congested.

24. A frame relay access device comprising:
means for receiving via a frame relay network a first frame relay packet that includes link status information for a plurality of virtual circuits that each share a first data link connection identifier;
means for generating a second frame relay packet that conforms to a standard local management interface format using the link status information in the first frame relay packet; and
means for transmitting the second frame relay packet to customer premise equipment.

25. The frame relay access device of claim 24 wherein the means for generating a second frame relay packet comprises means for including in the second frame relay packet a respective data link connection identifier for each of the plurality of virtual circuits that share the first data link connection identifier.

26. The frame relay access device of claim 24 wherein the link status information includes connection status information indicating for each of the plurality of virtual circuits whether the virtual circuit is active.

27. The frame relay access device of claim 24 wherein the link status information includes congestion status information indicating for each of the plurality of virtual circuits whether the virtual circuit is congested.

* * * * *